US008528979B2

(12) United States Patent
College (10) Patent No.: US 8,528,979 B2
(45) Date of Patent: Sep. 10, 2013

(54) TOOL-LESS FURNITURE ASSEMBLY JOINT AND APPLICATIONS

(76) Inventor: Philip M. College, Portland, OR (US)

( * ) Notice: Subject to any disclaimer, the term of this patent is extended or adjusted under 35 U.S.C. 154(b) by 220 days.

(21) Appl. No.: 13/102,579

(22) Filed: May 6, 2011

(65) Prior Publication Data

US 2012/0280550 A1  Nov. 8, 2012

(51) Int. Cl.
*A47C 7/16* (2006.01)
(52) U.S. Cl.
USPC .............. 297/440.13; 297/452.63; 312/257.1; 312/265.5
(58) Field of Classification Search
USPC .............. 297/440.1, 440.13, 440.14, 440.22, 297/452.63; 312/257.1, 263, 265.5; 52/589.1, 52/591.1, 591.2
See application file for complete search history.

(56) References Cited

U.S. PATENT DOCUMENTS

| 3,909,064 | A | * | 9/1975 | Payne et al. | 297/440.23 |
| 4,482,074 | A | * | 11/1984 | Lalley | 220/4.28 |
| 5,275,467 | A | * | 1/1994 | Kawecki | 297/440.13 |
| 5,803,548 | A | * | 9/1998 | Battle | 297/440.13 |
| 6,582,022 | B2 | * | 6/2003 | LaBlance | 297/440.14 |
| 6,955,401 | B1 | * | 10/2005 | Shoulberg | 297/440.13 |
| 7,066,553 | B2 | * | 6/2006 | Maloney | 297/452.63 |
| 7,300,110 | B1 | * | 11/2007 | Debien | 297/440.13 |
| 7,648,407 | B1 | * | 1/2010 | Sorensen | 446/120 |

* cited by examiner

*Primary Examiner* — Sarah B McPartlin
(74) *Attorney, Agent, or Firm* — Mersenne Law LLC

(57) ABSTRACT

Several variations of a tool-less, reversible joint having two tension fingers and at least one shear finger are described. Applications of the joint include items of flat-pack-style furniture such as chairs, tables and bookshelves. The joints can be formed in a sheet material such as plywood or medium-density fiberboard ("MDF").

15 Claims, 8 Drawing Sheets

TOOL-LESS FURNITURE ASSEMBLY JOINT AND APPLICATIONS

FIELD

The invention relates to structures for reversibly joining pieces of an assembly. More specifically, the invention relates to a sturdy joint design that can be used to connect two flat plates together. The joint may be used to create flat-pack furniture that can be assembled and disassembled manually without tools.

BACKGROUND

Flat-pack furniture (i.e., furniture that is principally made of shaped flat plates that are joined together) is popular with consumers because it is inexpensive yet functional, and because it can often be disassembled for easier storage or transportation. However, such furniture can often be complicated to assemble, and most items require tools such as a hammer, wrench or screwdriver. In fact, one well-known manufacturer of such furniture includes wrenches and other necessary assembly tools with its products. Consumers frequently discard or misplace the tools after assembling an item, so it may be inconvenient or difficult to disassemble later.

A sturdy furniture joint that can be assembled and disassembled by hand, without tools, may be useful for some types of flat-pack furniture. In addition, eliminating the tools, fasteners and the manufacturing expense of making fastener accommodations (e.g., dowel receiving holes, screw inserts, etc.) may reduce the cost of making this type of furniture.

SUMMARY

Embodiments of the invention are items of flat-pack furniture such as chairs, tables and bookshelves, that can be assembled by hand without requiring the use of a tool. A family of several different tool-less joint designs is described.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

The tool-less joint design described herein was developed as part of a flat-pack wooden deck chair, but the joints are generally applicable to the manufacture of light- and medium-duty furniture.

Figure 1A:
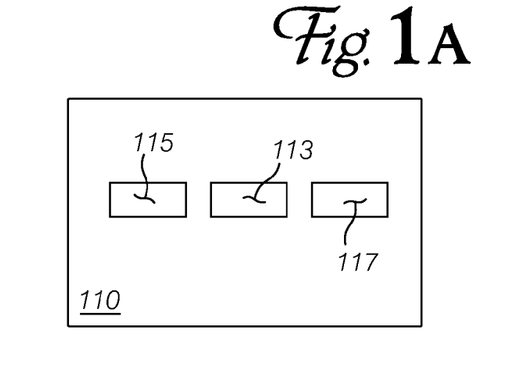
FIGS. 1A-1C show many common features of the parts of an embodiment.

FIG. 1A shows a plan view of a first of two members that can be joined together using an embodiment of the invention. Member 110, which will be called the "receiver" or "socket" part, is a flat plate with a central hole 113 and peripheral holes 115 and 117 located nearby. Hole 113 passes through plate 110, while holes 115 and 117 may be blind (i.e., they may not pass all the way through plate 110).

Figure 1B:
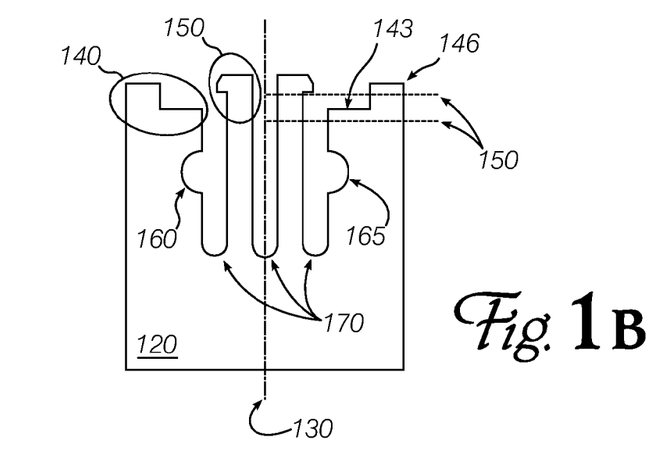

FIG. 1B shows a plan view of a second of the two members, the "insert" or "plug" 120. The insert is also a flat plate, which may be made of the same material as the receiver, or a different material (as discussed presently). In this sample embodiment, insert 120 is symmetrical about center line 130. Several protrusions or "fingers" are constructed in one end of the insert. The outer protrusion 140 (and its mirror image at 143, 146) is the "shear" protrusion, while the inner protrusion 150 and its mirror image (not marked) is the "tension" protrusion or "latch."

Figure 1C:
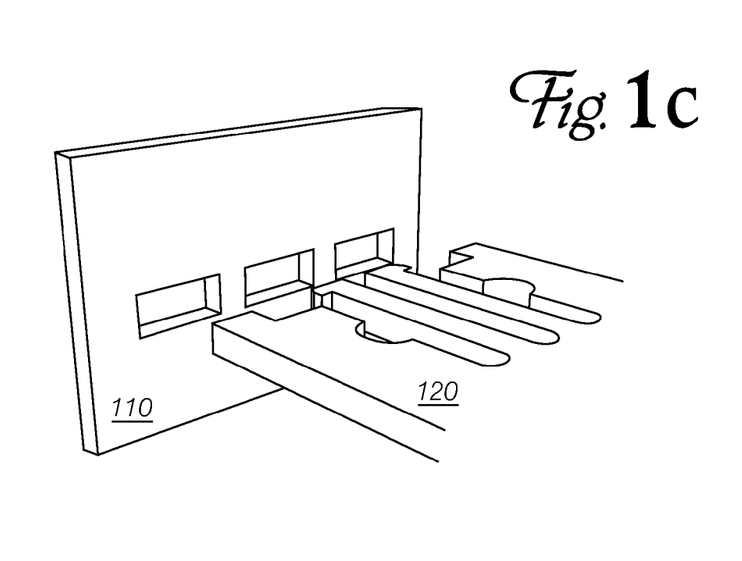

The insert 120 and receiver 110 can be united as shown generally in the perspective view at FIG. 1C. The shear fingers 140 pass into or through holes 115 and 117, while the tension fingers 150 pass through hole 113. Hole 113 is slightly narrower than the widest part of the tension fingers, so they are deflected during assembly and spring back when the insert and receiver are properly mated. Dashed lines 150 in FIG. 1B indicate where receiver 110 seats against insert 120 after assembly. When the tension fingers spring back, the parts are locked together. Shear fingers 140 (which may rest in blind holes 115, 117; pass all the way through receiver 110; or have steps 143 and 146, as shown, parts of which pass all the way through) resist shear forces and torsion about the centerline of insert 120.

To disassemble the joint, the tension fingers 150 are squeezed together so that insert 120 may be extracted from receiver 110. Cutouts 160 and 165 may be provided to permit easier access to tension fingers 150 for disassembly. The depth of cutouts 170 (or the lengths of the various protrusions) can be adjusted to set the spring constant of the tension fingers in favor of ease of assembly or ease of disassembly. The size and shape of the ends of the tension fingers 150 can also be adjusted to improve the stability of the joint. Generally speaking, the ends of the tension fingers have a somewhat barbed shape so that the insert plate can be inserted into the receiver fairly easily, but cannot be withdrawn easily without displacing the tension fingers. Displacement can be accomplished by pinching or expanding the fingers by hand, without using tools.

It is appreciated that the strength of the joint in tension, shear and torsion depends upon the material from which the receiver and insert are formed, the geometric shape of the tension fingers, the width of each of the shear fingers, and the displacement of the shear fingers from the centerline of the insert. As will be discussed in greater detail below, inserts and receivers made from a strong, resilient sheet material such as plywood are suitable for use in light-to-medium-duty furniture such as tables, chairs and bookcases. Note that the joint shown in FIG. 1C lacks strength out of the planes of the insert and receiver (i.e., the insert can be flexed up and down). Where this is a concern, a three-member structure, where some members have multiple "insert" or "receiver" features, or both "insert" and "receiver" features, can be constructed, as shown in FIGS. 2A and 2B.

Figure 2A:
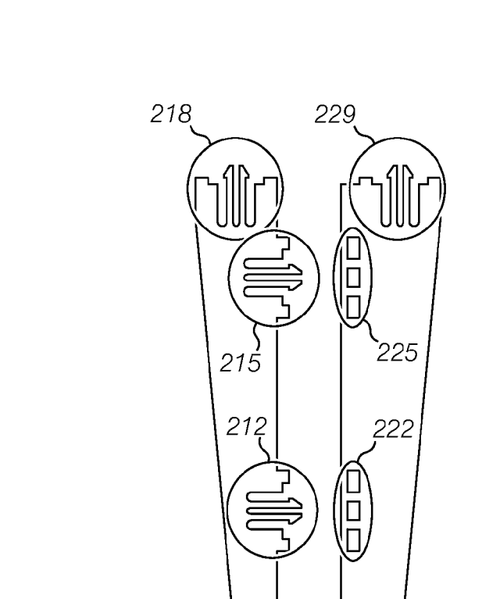
FIGS. 2A and 2B show how multiple joints according to an embodiment can be combined to obtain increased strength.
Figure 2B:
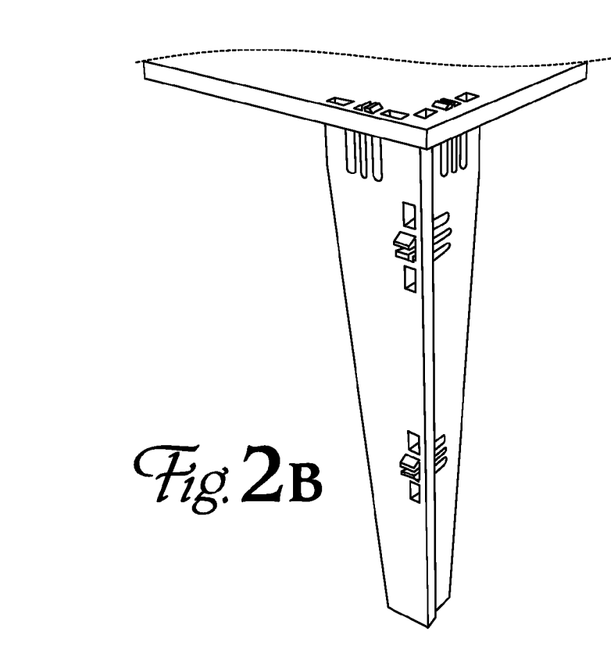

FIG. 2A shows plan views of two truncated triangular plates 210 and 220, and one corner portion of a rectangular plate 230. Plate 210 has three sets of insert fingers 212, 215 and 218, while plate 220 has two receivers (222, 225) and one insert feature 229. Plates 210 and 220 can be assembled by inserting fingers 212 and 215 into sockets 222 and 225; the third plate 230 can be attached atop plates 210 and 220 by inserting fingers 218, 229 into receivers 238, 239 to form, for example, a corner of a table. FIG. 2B shows this assembled structure.

Figure 3:
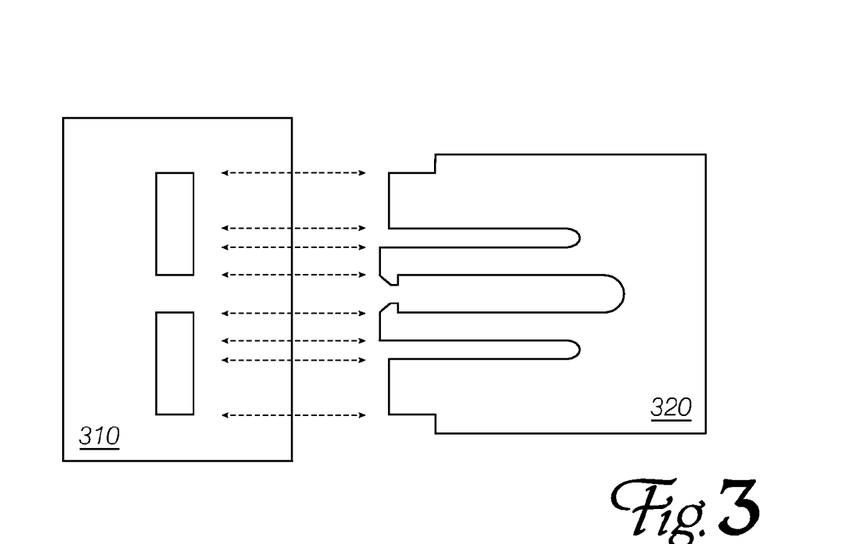
FIGS. 3-5 show alternate arrangements of the features that make up a joint according to an embodiment of the invention.
Figure 4:
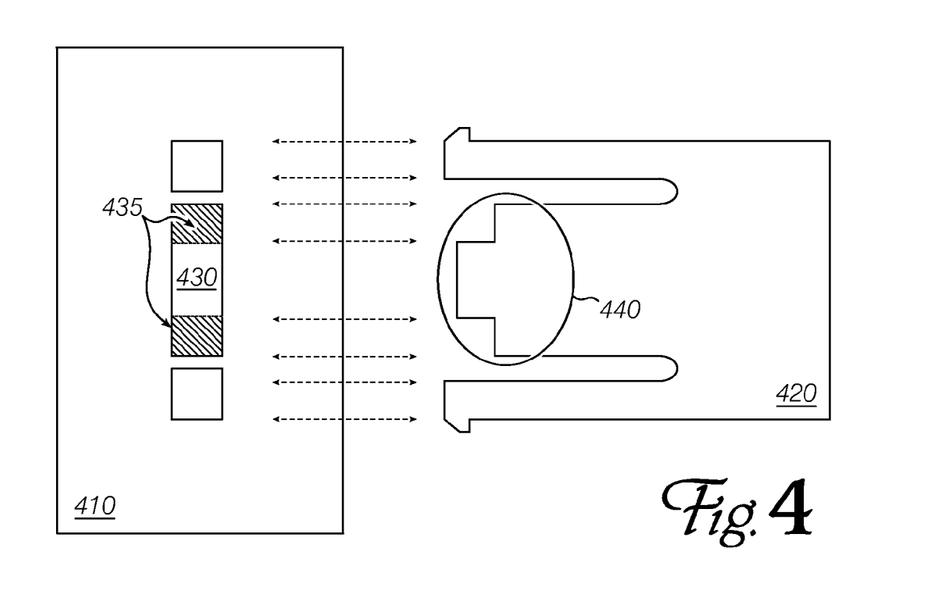
Figure 5:
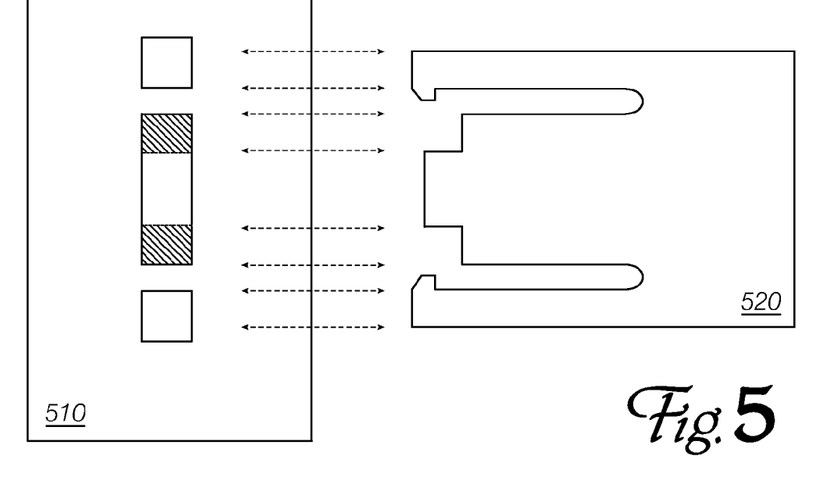

A number of variations of the basic structures shown in FIGS. 1A-1C are possible. FIG. 3 shows an insert 320 and corresponding receiver 310, where the tension fingers are displaced outwards (apart from each other) during assembly. Insert 320 need only have two holes, although it may also be constructed with separate holes for each of the tension and shear fingers (a total of four holes). FIG. 4 shows an insert 420 and receiver 410 where the tension fingers are outboard of the (single) shear finger 440. The shear finger fits into receiver hole 430, which is constructed of a central through-hole part flanked by blind depressions 435, which correspond to the shoulders of shear finger 440. Finally, FIG. 5 shows an insert 520 and receiver 510 where the tension fingers are outboard of the shear finger 540, and the tension fingers are forced apart during assembly. In all of these variations, the shear finger may pass all the way through the receiver, or may extend only partway into a blind or open hole in the receiver. In many embodiments, the shear finger(s) have a shoulder so that part of the finger rests against the face of the mated receiver, or in a blind hole in the mated receiver, to prevent the insert from entering too far into the receiver. Ideally, the insert can be inserted just far enough so that the barbed tension fingers, which are displaced during insertion, can spring back to their natural rest positions, thus locking the insert into the receiver.

Figure 6:
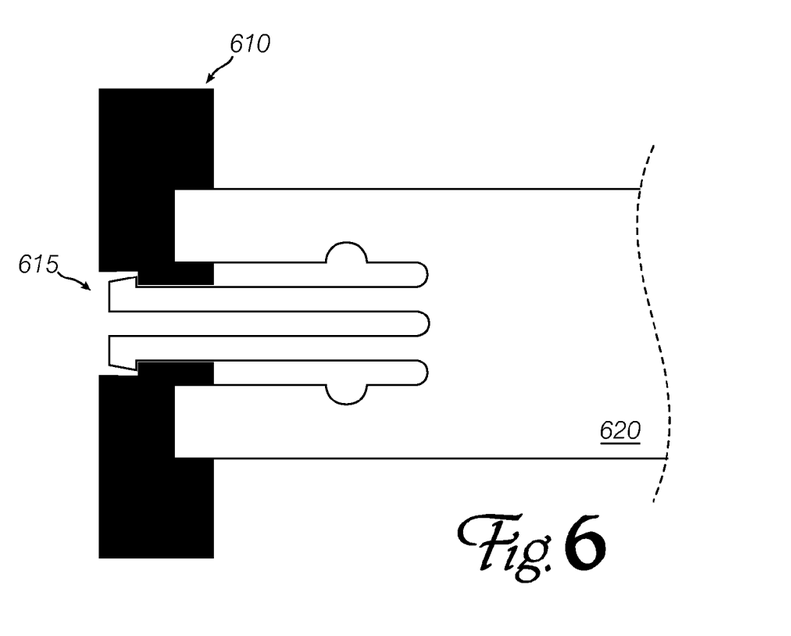
FIG. 6 shows a recessed joint.

The various forms of the tool-less furniture assembly joint described so far all have a portion of the insert member (the latch fingers) extending through the receiver and out the other side. However, at the cost of some additional complexity in the receiver fabrication, the latch fingers can be recessed flush with the receiver surface. FIG. 6 shows a section through a joint according to an embodiment of the invention, where the tension-finger hole is relieved or countersunk on the far side so that the tension finger barbs do not extend past the far surface of the receiver. The shear fingers can pass through part or all of the receiver plate, which is shown end-on and filled in black at 610. The countersunk portion is indicated at 615, while the insert plate is at 620. When this structure is used, a thicker receiver may be needed to obtain adequate joint strength.

Figure 7A:
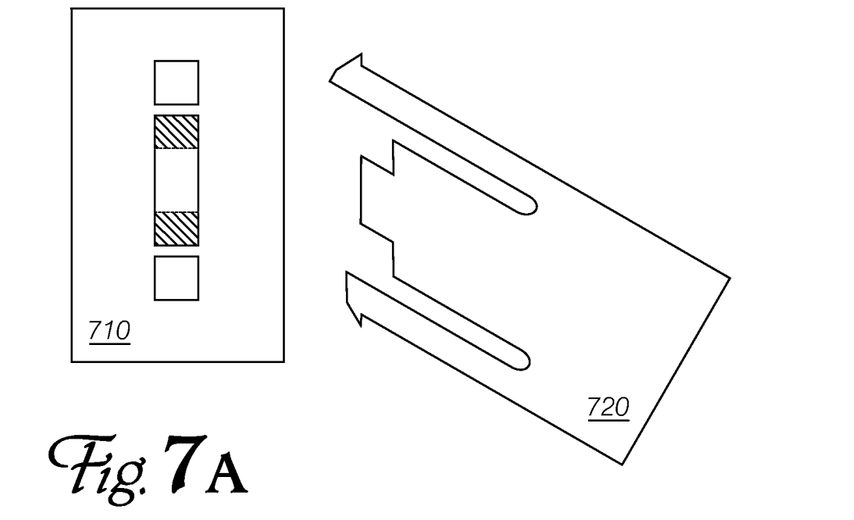
FIGS. 7A and 7B show a non-orthogonal joint.
Figure 7B:
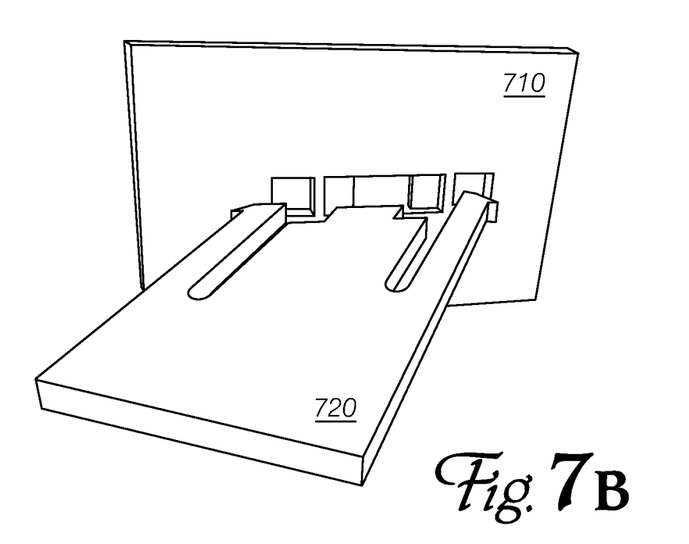

Although the example joints shown so far have been simple perpendicular connections, the insert can be cut or formed so that non-orthogonal connections may be constructed, as shown in FIGS. 7A and 7B. It is appreciated that the receiver holes can even be formed at angles other than normal to the receiver plane, thus allowing further flexibility in the joint angles, but these non-orthogonal holes may require additional degrees of freedom of the CNC tooling, or complex fixtures to secure the pieces during fabrication. Non-orthogonal holes are not shown in these figures, but are straightforward extensions of the structures illustrated so far, notwithstanding their increased difficulty of manufacture.

Figure 8:
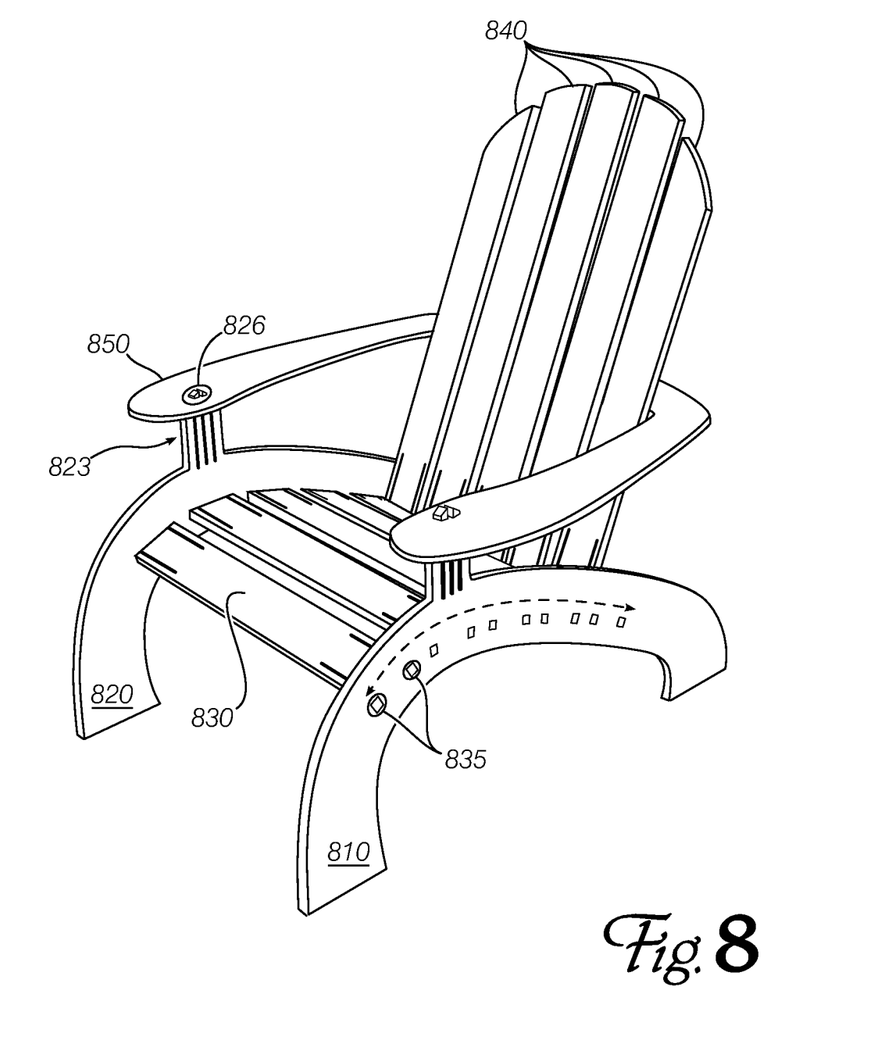
FIG. 8 shows an Adirondack-style deck chair constructed using the tool-less furniture joint.

Since the insert member(s) can be relatively narrow in width, a curved surface such as the bottom or back of a chair can be approximated by a number of planar inserts. FIG. 8 shows an Adirondack-style deck chair using two side panels 810, 820 with multiple receiver features, joined by mostly rectangular seat slats (one of which is identified at 830). Back panels 840 are inserted into the rear-most seat slat and are supported by a curved armrest 850, which is itself supported at its forward ends by an armrest support 823 in the form of an insert-style connection according to an embodiment of the invention.

The tension fingers of the armrest-support insert features of the side panels are visible on the top surface of the armrest at 826. Similarly, the tension fingers of the seat slats are visible on the outer surface of the left side panel 810; the two tension fingers of seat slat 830 are circled at 835. The dashed, arrow-headed curve on the left side panel indicates how the flat seat slats can be positioned to approximate a curved seating surface.

This chair can be shipped disassembled as a number of pre-cut plates. A consumer can assemble the chair without tools by snapping the appropriate inserts into their matching receivers. The chair can also be disassembled later for storage or shipping.

Figure 9:
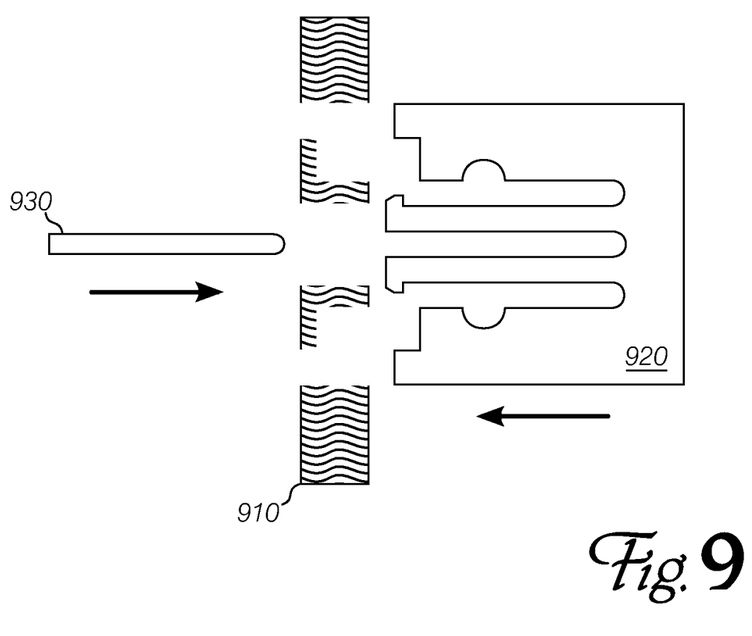
FIG. 9 shows how the joint can be locked with a wedge to prevent accidental disassembly.

It is appreciated that the tension and shear fingers need not be symmetrical. In some embodiments, asymmetrical fingers may be useful to prevent mis-assembly of a complex structure. To improve the sturdiness and permanence of an assembled piece, a wedge or similar structure may be used to prevent the tension fingers from being displaced, as shown in FIG. 9. After receiver 910 and insert 920 are mated, as described above, wedge or chock 930 is inserted between the tension fingers to prevent the fingers from being displaced (squeezed together, in this embodiment). Thus, joint members 910 and 920 cannot be disassembled after wedge 930 is installed. Nevertheless, assembly and disassembly can be accomplished without tools by removing the wedge and then displacing the tension fingers.

Figure 10:
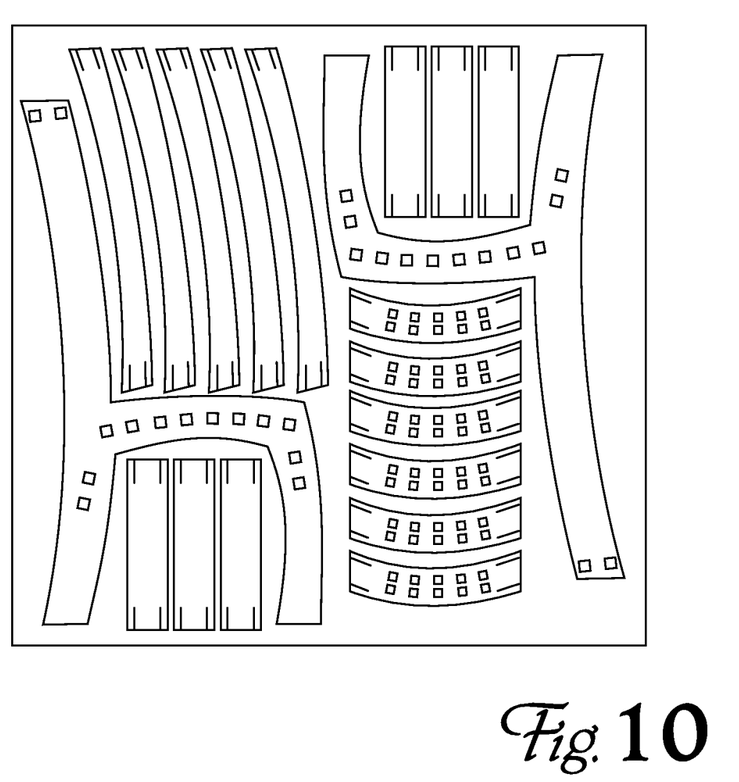
FIG. 10 shows a number of pieces of a flat-pack chair cut partially but not completely from a single sheet of material.

As mentioned earlier, inserts and receivers may be cut from a sheet material such as plywood or medium-density fiberboard ("MDF"). Through and blind holes can be cut using a computer numerically controlled ("CNC") tool such as a router, laser cutter or water-jet cutter. With careful design and layout, chairs, tables, chests, dressers, bookcases, and other flat-pack-style furniture can be manufactured with little waste. In fact, components can be mostly cut from sheets of material, but not entirely separated, so that many identical items can be shipped as a stack of (mostly) pre-cut rectangular sheets (see, for example, FIG. 10). Alternatively, some or all pieces of an item can be molded, cast or formed from a thermoplastic or other durable, resilient material. In one preferred embodiment, pieces of a chair are cut from sheets of bamboo plywood.

The making and use of the present invention have been described largely by reference to specific examples of flat-pack-style furniture. However, those of skill in the art will recognize that the tool-less joint designs described above can also be combined differently to create other items of furniture. Such variations and implementations are understood to be captured according to the following claims.

I claim:

1. A plurality of flat plates to be joined together without tools, comprising:
   an insert plate having two tension fingers and two shear fingers; and
   a receiver plate having three collinear holes adapted to engage the two tension fingers and the two shear fingers, wherein
   the two tension fingers are to be displaced from a rest position if the fingers of the insert plate are inserted into a central hole of the three collinear holes of the receiver plate;
   the two tension fingers are to return to near their rest position if the insert plate is fully inserted into the receiver plate;
   the two tension fingers have a barbed shape to resist removal of the insert plate from the receiver plate after the insert plate is fully inserted into the receiver plate, a first of the two shear fingers is positioned to enter a first outside one of the three collinear holes of the receiver plate; and a second of the two shear fingers is positioned to enter a second outside one of the three collinear holes of the receiver plate.

2. The plurality of flat plates of claim 1 wherein the two tension fingers are to be displaced towards each other if the tension fingers of the insert plate are inserted into the central hole of the three collinear holes of the receiver plate.

3. The plurality of flat plates of claim 1 wherein the outer two holes of the three collinear holes are blind holes.

4. The plurality of flat plates of claim 1 wherein the two tension fingers and the two shear fingers comprise a plug feature, and the three collinear holes comprises a socket feature, wherein the insert plate comprises a plurality of plug features; and
the receiver plate comprises at least one plug feature.

5. The plurality of flat plates of claim 1 wherein each flat plate is cut from a sheet of plywood.

6. An Adirondack-style deck chair comprising:

two side plates having an insert feature and a plurality of receiver features;

a first plurality of oblong seat slats each comprising insert features at either end;

a second plurality of oblong seat-back slats each comprising an insert feature at one end; and a semi-circular armrest comprising a receiver feature near each end of the semicircle, wherein each receiver feature comprises at least one hole;

each insert feature comprises two tension fingers and at least one shear finger adapted to reversibly engage the at least one hole of a corresponding receiver feature; and each insert feature can be mated with its corresponding receiver feature without using a tool.

7. The Adirondack-style deck chair of claim 6 wherein the plurality of receiver features of the side plates, when mated to the first plurality of oblong seat slats, approximate a curved seating surface.

8. The Adirondack-style deck chair of claim 6 wherein the receiver features of the semi-circular armrest are to engage the insert features of the side plates.

9. A plurality of flat plates to be joined together without tools, comprising:

an insert plate having two tension fingers and two shear fingers; and a receiver plate having two holes adapted to engage the two tension fingers and the two shear fingers, wherein the two tension fingers are to be displaced apart from each other and from a rest position if the fingers of the insert plate are inserted into the two holes of the receiver plate, a first of the two holes is adapted to engage a first of the two tension fingers and a first of the two shear fingers, and a second of the two holes is adapted to engage a second of the two tension fingers and a second of the two shear fingers.

10. A plurality of flat plates to be joined together without tools, comprising:

an insert plate having two tension fingers and one shear finger, the two tension fingers disposed at edges of the insert plate and flanking the shear finger; and a receiver plate having three collinear holes adapted to engage the two tension fingers and the shear finger, wherein the shear finger of the insert plate is configured to enter a central hole of the three collinear holes of the receiver plate;

each of the two tension fingers is configured to enter a corresponding one of two outside holes of the three collinear holes of the receiver plate;

the two tension fingers are to be displaced from a rest position if the fingers of the insert plate are inserted into the corresponding holes of the receiver plate;

the two tension fingers are to return to near their rest position if the insert plate is fully inserted into the receiver plate;

the two tension fingers have a barbed shape to resist removal of the insert plate from the receiver plate after the insert plate is fully inserted into the receiver plate, and one of the shear finger or the central hole have a structure to prevent the insert plate from entering the receiver plate further than necessary to engage the two tension fingers.

11. The plurality of flat plates of claim 10, wherein the central hole of the three collinear holes is partly blind.

12. The plurality of flat plates of claim 10, wherein the central hole of the three collinear holes is fully blind.

13. The plurality of flat plates of claim 10, wherein the shear finger comprises a shoulder feature positioned to rest against a face of the receiver plate when the insert plate is fully inserted into the receiver plate.

14. The plurality of flat plates of claim 10, wherein the tension fingers are to be displaced toward each other if the fingers of the insert plate are inserted into the corresponding holes of the receiver plate.

15. The plurality of flat plates of claim 10, wherein the tension fingers are to be displaced apart from each other if the fingers of the insert plate are inserted into the corresponding holes of the receiver plate.

* * * * *